United States Patent [19]

Borth et al.

[11] Patent Number: 4,630,305

[45] Date of Patent: Dec. 16, 1986

[54] AUTOMATIC GAIN SELECTOR FOR A NOISE SUPPRESSION SYSTEM

[75] Inventors: David E. Borth, Palatine; Ira A. Gerson, Hoffman Estates; Philip J. Smanski; Richard J. Vilmur, both of Palatine, all of Ill.

[73] Assignee: Motorola, Inc., Schaumburg, Ill.

[21] Appl. No.: 750,941

[22] Filed: Jul. 1, 1985

[51] Int. Cl.[4] .............................................. H04B 15/00

[52] U.S. Cl. ...................................... 381/94; 381/68.2

[58] Field of Search ..................... 381/94, 71, 73, 102, 381/104; 179/107 FD

[56] References Cited

U.S. PATENT DOCUMENTS

| | | | |
|---|---|---|---|
| 3,180,936 | 4/1965 | Schroeder | 179/1 |
| 3,803,357 | 4/1974 | Sacks | 179/1 P |
| 4,025,721 | 5/1977 | Graupe | 381/94 |
| 4,052,568 | 10/1983 | Jankowski | 179/15 |
| 4,185,168 | 1/1980 | Graupe et al. | 179/1 P |
| 4,219,695 | 8/1980 | Wilkes | 179/1 P |
| 4,239,938 | 12/1980 | Ponto | 381/104 |
| 4,331,837 | 5/1982 | Soumagne | 179/1 P |
| 4,378,603 | 3/1982 | Eastmond | 455/79 |
| 4,396,806 | 8/1983 | Anderson | 179/107 FD |
| 4,403,118 | 9/1983 | Zollner | 179/107 FD |
| 4,410,763 | 10/1983 | Strawczynski | 364/513.5 |
| 4,433,435 | 2/1984 | David | 381/94 |
| 4,454,609 | 6/1984 | Kates | 381/68 |
| 4,461,025 | 7/1984 | Franklin | 381/56 |
| 4,490,841 | 12/1984 | Chaplin | 381/94 |
| 4,508,940 | 4/1985 | Steeger | 179/107 FD |

FOREIGN PATENT DOCUMENTS 1087816 10/1967 United Kingdom .

OTHER PUBLICATIONS

Steven F. Boll, "Suppression of Acoustic Noise in Speech Using Spectral Subtraction", IEEE Trans. On Acoust., Speech, and Signal Processing, vol. ASSP-27, No. 2, Apr. 1979, pp. 113-120.

Peter De Souza, "A Statistical Approach to the Design of an Adaptive Self-Normalizing Silence Detector", IEEE Trans. on Acoust., Speech, and Signal Processing, vol. ASSP-31, No. 3, Jun. 1983, pp. 678-684.

W. J. Done, et al., "Estimating the Parameters of a Noisy All-Pole Process Using Pole-Zero Modeling", IEEE ICASSP'79, Apr. 1979, pp. 228-231.

George A. Hellworth, et al., "Automatic Conditioning of Speech Signals", IEEE Transactions on Audio and Electroacoustics, vol. AU-16, No. 2, Jun. 1968, pp. 169-179.

Wolfgang Hess, "A Pitch Synchronous Digital Feature Extraction System for Phonemic Recognition of Speech", IEEE Trans. on Acoust. Speech and Signal Processing, vol. ASSP-24, No. 1, Feb. 1976, pp. 14-25.

Jae S. Lim, et al., "Enhancement and Bandwidth Compression of Noisy Speech", Proceedings of the IEEE, vol. 67, No. 12, Dec. 1979, pp. 1586-1604.

Robert J. McAulay, et al., "Speech Enhancement Using a Soft-Decision Noise Suppression Filter", IEE Trans. Acoust. Speech, and Signal Processing, vol. ASSP-28, No. 2, Apr. 1980, pp. 137-145.

*Primary Examiner*—Gene Z. Rubinson

*Assistant Examiner*—L. C. Schroeder

*Attorney, Agent, or Firm*—Douglas A. Boehm; Donald B. Southard; Charles L. Warren

[57] ABSTRACT

An automatic gain selector is disclosed for use with a noise suppression system which performs speech quality enhancement upon a noisy speech signal available at the input to generate a noise-suppressed speech signal at the output by spectral gain modification. The channel gain controller (240) of the present invention produces a modification signal (245), comprised of individual channel gain values, for application to a channel gain modifier (250). A particular gain table set is automatically selected from one of a plurality of gain tables (450) by a selector switch (470) and a noise level quantizer (440) in response to a multi-channel noise parameter, such as the overall average background noise level of the input signal. Then the individual channel gain values (455) are obtained from the particular gain table set in response to the individual channel signal-to-noise ratio estimate (235). Hence, each individual channel gain value is selected as a function of (a) the channel number, (b) the current channel SNR estimate, and (c) the overall average background noise level. The automatic gain selector further includes a gain smoothing filter (460) for smoothing these noise suppression gain factors on a per-sample basis thereby improving noise flutter performance caused by step discontinuities in frame-to-frame gain changes.

42 Claims, 8 Drawing Figures

—PRIOR ART—

AUTOMATIC GAIN SELECTOR FOR A NOISE SUPPRESSION SYSTEM

BACKGROUND OF THE INVENTION

1. Field of the Invention

The present invention relates generally to acoustic noise suppression systems, and, more particularly, to a novel technique for automatically selecting gain parameters for a noise suppression system employing spectral subtraction.

2. Description of the Prior Art

The primary objective of acoustic noise suppression systems is to improve the overall quality of speech. The addition of noise suppression to a speech communication system enhances speech intelligibility by filtering environmental background noise from the desired speech signal. This speech enhancement process is particularly necessary in environments having abnormally high levels of ambient background noise, such as a noisy factory, an aircraft, or a moving vehicle.

Numerous approaches have been proposed for enhancement of speech that has been degraded by ambient background noise. An overview of these techniques may be found in J. S. Lim and A. V. Oppenheim, "Enhancement and Bandwidth Compression of Noisy Speech," *Proc. IEEE,* vol. 67, no. 12 (December 1979), pp. 1586–1604. One very sophisticated technique, described therein, is the process of spectral subtraction. In this approach, the entire input signal spectrum is divided by a bank of bandpass filters, and particular spectral bands (corresponding to the filtered output signals) exhibiting relatively low signal-to-noise ratios (SNRs) are attenuated. All of the spectral bands, including both the attenuated bands and those bands which were not affected due to the their high SNRs, are then recombined to produce the noise-suppressed output signal Several modifications to the basic spectral subtraction noise suppression technique have been described in the prior art. For example, R. J. McAulay and M. L. Malpass, in the article "Speech Enhancement Using a Soft-Decision Noise Suppression Filter," *IEEE Trans. Acoust., Speech, Signal Processing,* vol. ASSP-28, no. 2, (April 1980), pp. 137–145, propose a two-state soft-decision maximum-liklihood algorithm which results in a class of various noise suppression curves. In terms of a noise suppression prefilter, these curves determine the amount of suppression applied to a particular frequency channel by utilizing the measured SNR as a pointer for a look-up table to determine the attenuation for that particular spectral band. In other words, the noise suppression gain parameter is determined as a function of the individual channel number and the estimated signal-to-noise ratio.

Alternative methods for determining the noise suppression gain factors are described by Kates, in U.S. Pat. No. 4,454,609 and by Graupe et. al., in U.S. Pat. No. 4,185,168. Kates describes a combinational logic matrix providing weighting factors based upon certain combinations of the envelope-detected input signal energies and empirically-determined constant coefficients. These weights are then compared to a preselected threshold, and a gain factor is selected. Graupe describes an adaptive filter wherein the gain-to-noise parameter relationship approximates that of a Weiner or Kalman filter. Again, the gain parameters are selected as a function of the amount of detected energy in a particular band of input signal.

However, in specialized applications involving abnormally high background noise levels, even the more sophisticated noise suppression techniques become ineffective. One example of such application is the vehicle speakerphone option to a cellular mobile radio telephone system which provides hands-free operation for the automobile driver. The mobile hands-free microphone is typically located at a greater distance from the user, such as being mounted overhead on the visor. The more distant microphone delivers a much poorer signal-to-noise level to the land-end party due to road and wind noise conditions. Although the received speech signal at the land-end is usually intelligible, continuous exposure to such background noise levels often increases listener fatigue.

Although most prior art techniques perform sufficiently well under nominal background noise conditions, the performance of these approaches becomes severely limited when used in such specialized applications of unusually high background noise. Typical spectral subtraction noise suppression systems may reduce the background noise level over the voice frequency spectrum by as much as 10 dB without seriously affecting the speech quality. However, when these prior art techniques are used in relatively high background noise environments requiring noise suppression levels approaching 20 dB, there is a substantial degradation in the quality characteristics of the voice. Furthermore, in rapidly-changing high noise environments, a severe low frequency noise flutter develops in the output speech signal. This noise flutter is inherent to a spectral subtraction noise suppression system, since the individual channel gain parameters are continuously being updated in response to the changing background noise environment.

Hence, acoustic noise suppression systems usually represent a substantial compromise between noise suppression depth and distortion of the desired speech signal. A need, therefore, exists for an improved method and means for selecting noise suppression gain parameters adapted for use in high ambient noise environments without compromising voice quality

SUMMARY OF THE INVENTION

Accordingly, it is an object of the present invention to provide an improved method and apparatus for suppressing background noise in speech communications systems.

Another object of the present invention is to provide an improved noise suppression system which attains sufficient noise attenuation in high background noise environments without significantly degrading the voice quality.

Still another object of the present invention is to provide a means and method for improving noise flutter performance of a noise suppression system used in high background noise environments.

A more particular object of the present invention is to provide a means to automatically select noise suppression gain factors for a spectral gain modification noise suppression system as a function of the average background noise level.

In accordance with the present invention, an improved noise suppression system employing spectral gain modification is provided which performs speech quality enhancement by attenuating the background noise from a noisy pre-processed input signal—the speech-plus-noise signal available at the input of the noise suppression system—to produce a noise-suppressed post-processed output signal—the speech-minus-noise signal provided at the output of the noise suppression system—by spectral gain modification. The noise suppression system of the present invention includes a means for separating the input signal into a plurality of pre-processed signals representative of selected frequency channels, and a means for modifying an operating parameter, such as the gain, of each of these pre-processed signals according to a modification signal to provide post-processed noise-suppressed output signals. The means for generating the modification signal is responsive not only to the noise content of each individual channel, but also to a multi-channel noise parameter such as an average overall background noise level.

Accordingly, the automatic gain selection means of the present invention produces gain factors for each channel by automatically selecting one of a plurality of gain table sets in response to the overall average background noise level of the input signal, and by selecting one of a plurality of gain values from each gain table in response to the individual channel signal-to-noise ratio estimate. Thus, each individual channel gain value is selected as a function of (a) the channel number, (b) the current channel SNR estimate, and (c) the overall average background noise level. This gain table selection technique allows a wider choice of channel gain values adaptable to particular background noise environments, thereby permitting significantly more noise suppression depth without increasing distortion in the noise-suppressed speech.

The problem of severe noise flutter caused by step discontinuities in frame-to-frame noise suppression gain changes is also addressed by the present invention. The automatic gain selector of the present invention includes a means for smoothing these noise suppression gain factors for each individual channel on a per-sample basis. This smoothing of the raw gain factors during every sample of speech, as opposed to every frame of speech, effectively eliminates the discontinuities in the output waveform, such that the noise flutter performance is significantly improved without degradation of the voice quality. Furthermore, the present invention utilizes different smoothing coefficients for each channel to compensate for the different gain table sets employed. This correlation of the per-channel gain smoothing filter time constant to the overall average background noise level results in a further improvement in the audible quality of the speech.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DESCRIPTION OF THE PREFERRED EMBODIMENTS

Figure 1:
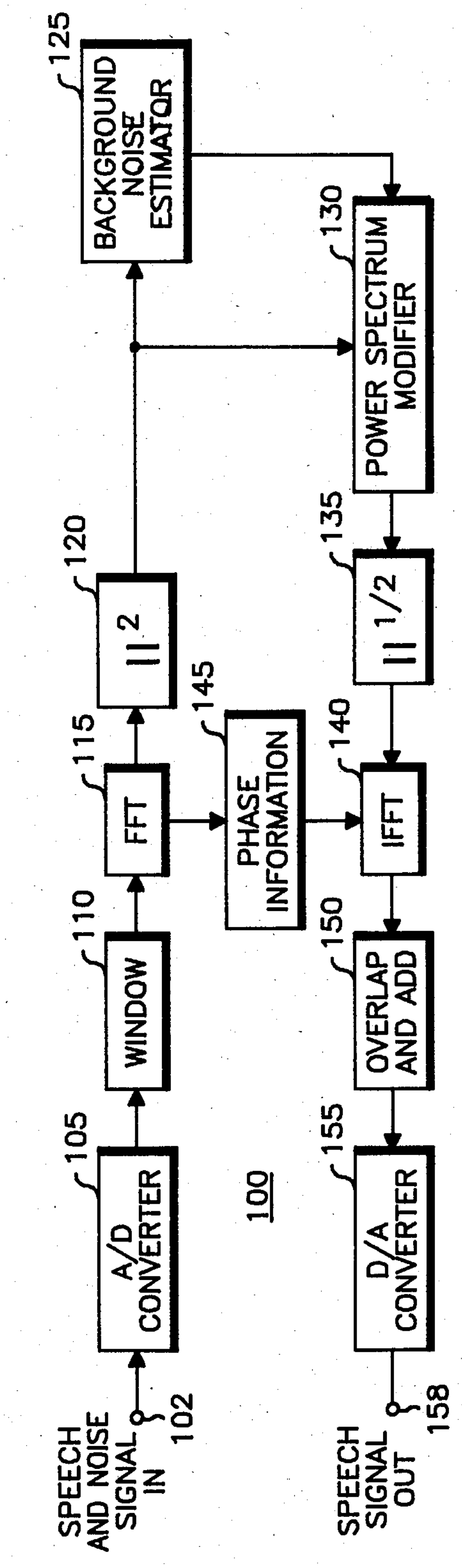
PRIOR ART Fig. 1
FIG. 1 is a block diagram of a basic noise suppression system known in the art which illustrates the spectral gain modification technique.

FIG. 1 illustrates the general principle of spectral subtraction noise suppression as known in the art. A continuous time signal containing speech plus noise is applied to input 102 of noise suppression system 100. This signal is then converted to digital form by analog-to-digital converter 105. The digital data is then segmented into blocks of data by the windowing operation (e.g., Hamming, Hanning, or Kaiser windowing techniques) performed by window 110. The choice of the window is similar to the choice of the filter response in an analog spectrum analysis. The noisy speech signal is then converted into the frequency domain by Fast Fourier Transform (FFT) 115. The power spectrum of the noisy speech signal is calculated by magnitude squaring operation 120, and applied to background noise estimator 125 and to power spectrum modifier 130.

The background noise estimator performs two functions: (1) it determines when the incoming speech-plus-noise signal contains only background noise; and (2) it updates the old background noise power spectral density estimate when only background noise is present. The current estimate of the background noise power spectrum is subtracted from the speech-plus-noise power spectrum by power spectrum modifier 130, which ideally leaves only the power spectrum of clean speech. The square root of the clean speech power spectrum is then calculated by magnitude square root operation 135. This magnitude of the clean speech signal is combined with the phase information 145 of the original signal, and converted from the frequency domain back into the time domain by Inverse Fast Fourier Transform (IFFT) 140. The discrete data segments of the clean speech signal are then applied to overlap-and-add operation 150 to reconstruct the processed signal. This digital signal is then re-converted by digital-to-analog converter 155 to an analog waveform available at output 158. Thus, an acoustic noise suppression system employing the spectral subtraction technique requires an accurate estimate of the current background noise power spectral density to perform the noise cancellation function.

One significant drawback of the Fourier Transform approach of FIG. 1 is that it is a digital signal processing technique requiring considerable computational power to implement the noise suppression system in the frequency domain. Another disadvantage of the FFT approach is that the output signal is delayed by the time required to accumulate the samples for the FFT calculation. An alternate implementation of the noise suppression system is the channel filter-bank technique illustrated in FIG. 2.

Figure 2:
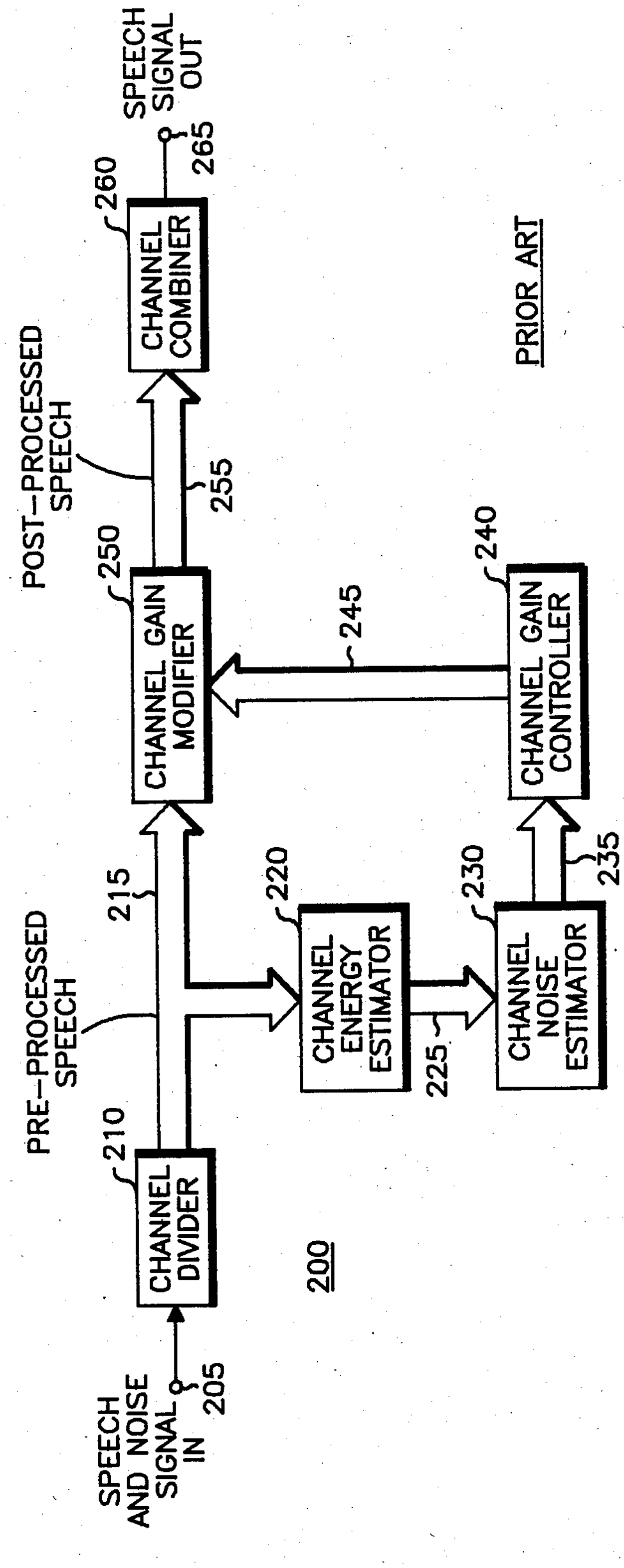
FIG. 2 is a block diagram of an alternate implementation of a prior art noise suppression system illustrating the channel filter-bank technique.

In noise suppression system 200 of FIG. 2, the speech plus noise signal available at input 205 is separated into a number of selected frequency channels by channel divider 210. The gain of these individual pre-processed speech channels 215 is then adjusted by channel gain modifier 250 in response to modification signal 245 such that the gain of the channels having a low speech-to-noise ratio is reduced. The individual channels comprising post-processed speech 255 are then recombined in channel combiner 260 to form the noise-suppressed speech signal available at output 265. This time domain implementation is preferable for use in speech recognition systems and modern noise suppression systems, since it is much more computationally efficient than the FFT approach.

Channel divider 210 is typically comprised of a number N of contiguous bandpass filters. In the present embodiment, 14 Butterworth bandpass filters are used to span the voice frequency range 250–3400 Hz., although any number and type of filters my be used. The particular filter implementation will subsequently be described in FIG. 3.

Channel gain modifier 250 serves to adjust the gain of each of the individual channels comprising pre-processed speech 215. This modification is performed by multiplying the amplitude of the pre-processed input signal in a particular channel by its corresponding channel value obtained from modification signal 245. The channel gain modification function may readily be implemented in software utilizing digital signal processing (DSP) techniques, as will be described later.

Similarly, the summing function of channel combiner 260 may be implemented either in software, using DSP, or in hardware utilizing a summation circuit to combine the N post-processed channels into a single post-processed output signal. Hence, the channel filter-bank technique separates the noisy input signal into individual channels, attenuates those channels having a low speech-to-noise ratio, and recombines the individual channels to form a low-noise output signal.

The individual channels comprising pre-processed speech 215 are also applied to channel energy estimator 220, which serves to generate energy envelope values $E_1$–$E_N$ for each channel. These energy values, which comprise channel energy estimate 225, are utilized by channel noise estimator 230 to provide an SNR estimate $X_1$–$X_N$ for each channel. The SNR estimates 235 are then fed to channel gain controller 240 which provides the individual channel gains $G_1$–$G_N$ comprising modification signal 245.

Channel energy estimator 220 is comprised of a set of N energy detectors to generate an estimate of the pre-processed signal energy in each of the N channels. The specific implementation techniques will be discussed in the description following the next Figure.

Channel noise estimator 230 generates SNR estimates 235 by comparing the total amount of signal-plus-noise energy in a particular channel to some type of estimate of the background noise. This background noise estimate may be generated by performing a channel energy measurement during the pauses in human speech, or may be assigned a predetermined constant, or may be provided by other estimation techniques. The specific implementation used in the present embodiment will be discussed with FIG. 4.

Channel gain controller 240 generates the individual channel gain values of the modification signal 245 in response to SNR estimates 235. One method of selecting gain values is to compare the SNR estimate with a preselected threshold and to provide for unity gain when the SNR estimate is below the threshold, and to provide an increased gain at or above the threshold. A second approach is to compute the gain value as a function of the SNR estimate such that the gain value corresponds to a particular mathematical relationship to the SNR. (i.e., linear, logarithmic, etc.) The present embodiment uses a third approach, that of selecting the channel gain values from a channel gain table set comprised of empirically determined gain values. This approach will also be fully described in conjunction with FIG. 4.

Figure 3:
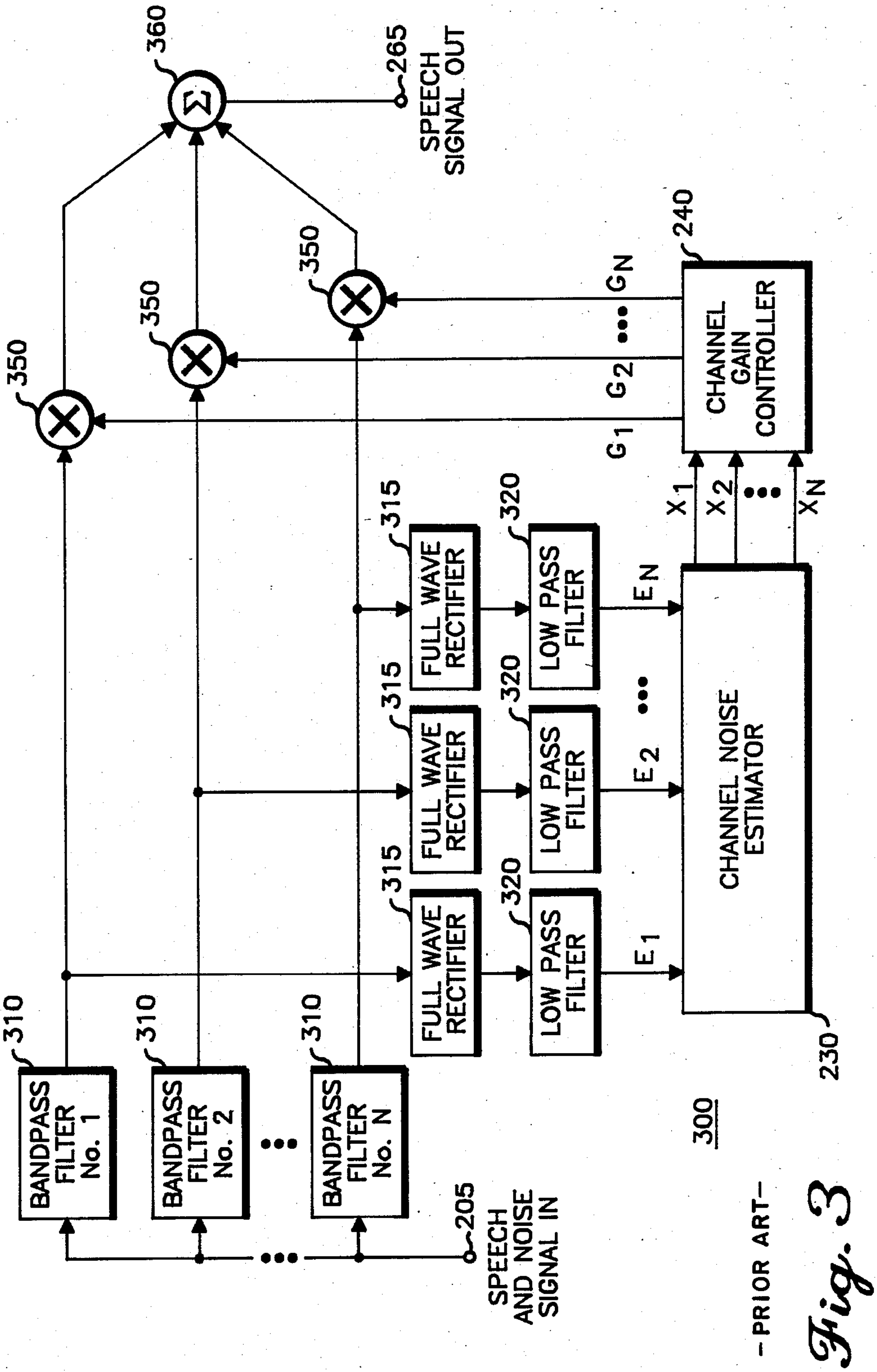
FIG. 3 is a detailed block diagram illustrating the implementation of the channel filter-bank technique.

FIG. 3 further illustrates the channel filter-bank technique of spectral gain modification noise suppression. The speech-plus-noise signal is applied to input 205 of channel filter-bank noise suppression prefilter 300. (The input signal may first be pre-emphasized to increase the gain of the high frequency noise and unvoiced components, since these components are normally lower in energy as compared to low frequency voiced components.) The input signal is fed to filter-bank 310, which corresponds to channel divider 210 of FIG. 2. The N contiguous bandpass filters 310 overlap at the 3 dB points such that the reconstructed output signal exhibits less than 1 dB of ripple in the entire voice frequency range. In the present embodiment, 14 narrowband filters are used to span the frequency range 250–3400 Hz. Each filter is configured as a 4-pole Butterworth bandpass filter. Additionally, the preferred embodiment utilizes digital signal processing (DSP) techniques to digitally implement in software the function of bandpass filters 310. Appropriate DSP algorithms are described in Chapter 11 of L. R. Rabiner and B. Gold, *Theory and Application of Digital Signal Processing*, (Prentice Hall, Englewood Cliffs, N.J., 1975).

The N channel filter outputs are then rectified by full-wave rectifiers 315, and smoothed by low-pass filters 320 to obtain an energy envelope value $E_1$–$E_N$ for each channel. This energy detecting process, which corresponds to the function of channel energy estimator 220, may be implemented in hardware using discrete rectifier/filter networks, or may be implemented in software using DSP techniques as referenced above.

The channel estimates $E_1$–$E_N$ are then applied to channel noise estimator 230 which provides an SNR estimate $X_1$–$X_N$ for each channel. These SNR estimates are then fed to channel gain controller 240 which produces individual channel gains $G_1$–$G_N$. Channel noise estimator 230 and channel gain controller 240 will be described in detail in FIG. 4.

The amplitude of each of the outputs from bandpass filters 310 are multiplied by the appropriate channel gain value from channel gain controller 240 at channel multipliers 350. This multiplication serves to modify the gain of the pre-processed channels to produce post-processed channels. Again, this function is performed in software in the present embodiment.

The post-processed channels are then recombined at summation circuit 360, which corresponds to channel combiner 260 of FIG. 2. The recombined speech signal (which may be de-emphasized if required) is provided as noise-suppressed clean speech at output 265.

The value of channel gains $G_1$–$G_N$ is dependent upon the SNR of the detected signal. When voice predominates in an individual channel, the channel signal-to-noise ratio estimate $X_N$, provided by channel noise estimator 230, will be high. Consequently, channel gain controller 240 will increase the gain for that particular channel. The amount of the gain rise is dependent on the detected SNR—the greater the SNR, the more the individual channel gain will be raised. If only noise is present in the individual channel, the SNR estimate will be low, and the gain for that channel will be reduced. Since voice energy does not appear in all of the channels at the same time, the channels containing a low voice energy level (mostly background noise) will be suppressed (subtracted) from the voice energy spectrum. In short, the channel filter-bank technique simply suppresses the background noise in the individual channels which have a low signal-to-noise ratio.

Figure 4:
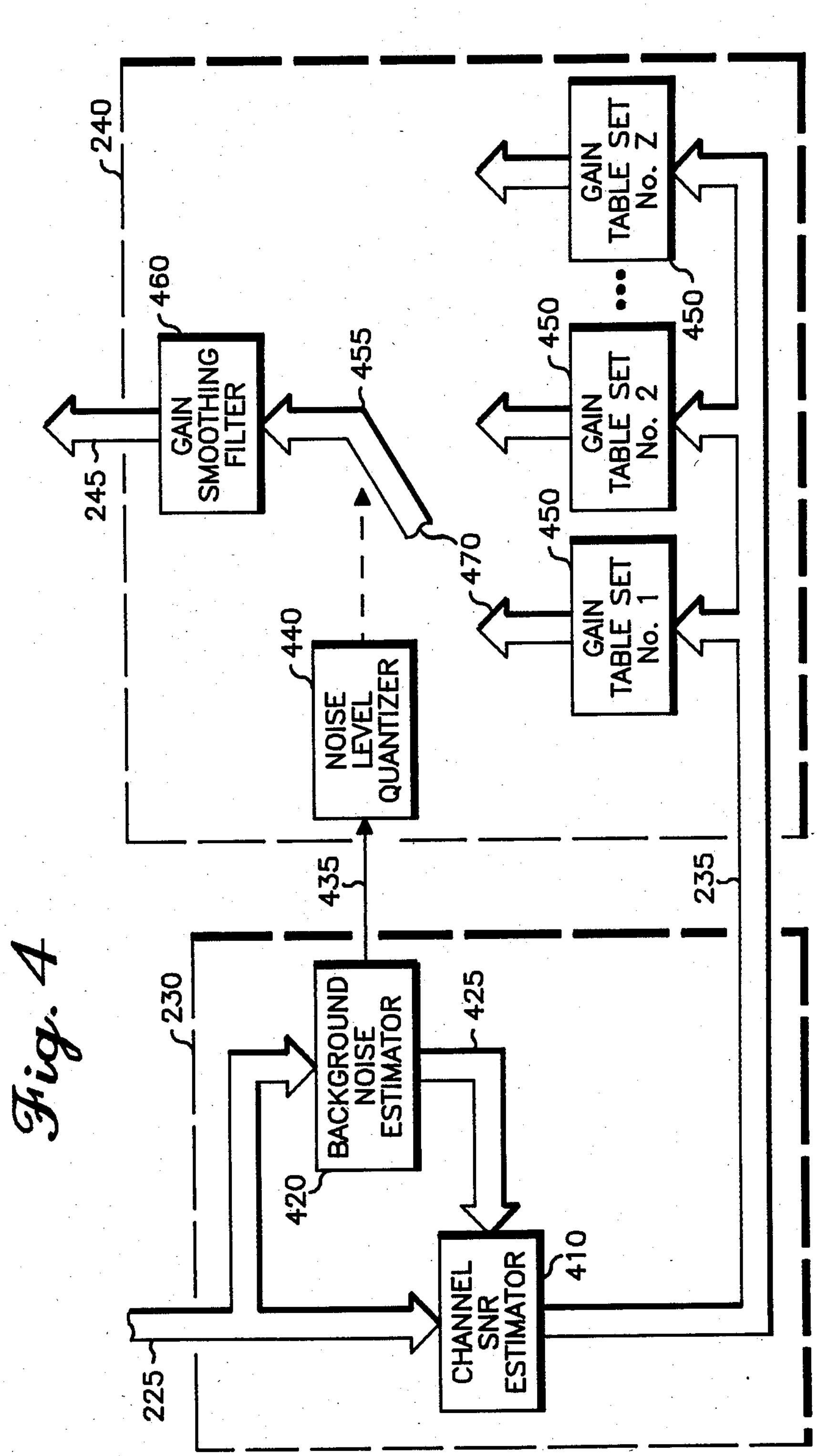
FIG. 4 is a detailed block diagram illustrating the preferred embodiment of the present invention channel gain controller block of FIG. 3.

FIG. 4 shows a detailed block diagram of channel noise estimator 230 and channel gain controller 240 of the two previous Figures. Accordingly, channel energy estimates 225 are comprised of individual channel energy envelope values $E_1$–$E_N$, SNR estimates 235 are comprised of individual channel SNR values $X_1$–$X_N$, and modification signal 245 is comprised of individual channel gain values $G_1$–$G_N$.

Channel noise estimator 230 is comprised of background noise estimator 420 and channel SNR estimator 410. SNR estimates $X_1$–$X_N$ are generated by comparing the individual channel energy estimates 225 of the current input signal energy (signal-plus-noise) to some type of current estimate of the background noise energy 425 (all noise). This background noise estimate 425 may be generated by performing a channel energy measurement during the pauses in human speech. Thus, background noise estimator 420 continuously monitors the input speech signal to locate the pauses in speech, and measures the background noise energy during that precise time interval. Channel SNR estimator 410 then compares this background noise estimate 425 to the pre-processed speech energy estimate 225 to form signal-to-noise estimates 235 on a per-channel basis. In the present embodiment, this SNR comparison is performed as a software division of the channel energy estimates by the background noise estimates on an individual channel basis.

In generating background noise estimate 425, two basic functions must be performed. First, a determination must be made as to when the incoming speech-plus-noise signal contains only background noise—during the pauses in human speech. In the present embodiment, this speech/noise decision is performed by periodically detecting the minima of the input speech signal, either on an individual channel basis or an overall combined channel basis. Secondly, the speech/noise decision is utilized to control the time at which the background noise energy measurement is taken, thereby providing a mechanism to update the old background noise estimate. A background noise energy measurement is performed by generating and storing an estimate of the background noise energy of pre-processed speech 215 (see FIG. 2), as provided by channel energy estimate 225.

Numerous methods may be used to detect the minima of the input speech signal energy, or to generate and store the estimate of the background noise energy. The particular approach used in the present embodiment for detecting the minima of the speech signal energy is the energy valley detector technique.

An energy valley detector utilizes a single combined overall estimate of the N input channel energy estimates to detect the pauses in speech. This detection process is accomplished in three steps. First, an initial valley level is established. If background noise estimator 420 has not previously been initialized, then an initial valley level is created which would correspond to a high background noise environment. Otherwise, the previous valley level is maintained as its background noise energy history. Next, the previous (or initialized) valley level is updated to reflect current background noise conditions. This is accomplished by comparing the previous valley level to the value of the single overall energy estimate. A current valley level is formed by this updating process. This current valley level 435 is subsequently used by channel gain controller 240, which will be discussed later.

The third step performed by an energy valley detector is that of making the actual speech/noise decision. A preselected valley offset is added to the updated current valley level to produce a noise threshold level. Then the value of the single overall energy estimate is again compared, only this time to the noise threshold level. When this energy estimate is less than the noise threshold level, the energy valley detector generates a speech/noise control signal (valley detect signal) indicating that no voice is present.

The valley detect signal is used to determine precisely when to load in a new estimate of the input signal energy into a background noise storage register as a background noise estimate. (If no previous background noise estimate exists, then the background noise storage register is preset with an initialization value representing a background noise estimate approximating that of clean speech.) A positive valley detect signal causes the old background noise estimate (or initialized estimate) to be updated by directing the background noise storage register to store new channel energy estimates. Since these energy estimates are obtained during the detected minima of the input signal level (when no voice is present), then the channel energy estimates represent a very accurate estimate of the background noise level. Thus, background noise estimate 425. is continuously available for use by channel SNR estimator 410.

The channel SNR estimator compares background noise estimate 425 to channel energy estimates 225 to generate SNR estimates 235. As previously noted, this SNR comparison is performed in the present embodiment as a software division of the channel energy estimates (signal-plus-noise) by the background noise estimates (noise) on an individual channel basis. SNR estimates 235 are then used to select particular gain values from a channel gain table comprised of empirically determined gains.

Gain tables generally provide nonlinear mapping between the channel SNR inputs $X_1$–$X_N$ and the channel gain outputs $G_1$–$G_N$. A gain table is basically a two-dimensional array of empirically-determined gain values. These channel gain values are typically selected as a function of two variables: (a) the individual channel number N; and (b) the individual SNR estimate $X_N$. When voice is present in an individual channel, the channel signal-to-noise ratio estimate will be high. A large SNR estimate $X_N$ would result in a channel gain value $G_N$ approaching a maximum value (i.e., 1 in the present embodiment). The amount of the gain rise may be designed to be dependent upon the detected SNR—the greater the SNR, the more the individual channel gain will be raised from the base gain (all noise). If only noise is present in the individual channel, the SNR estimate will be low, and the gain for that channel will be reduced, approaching a minimum base gain value (i.e., 0). Voice energy does not appear in all of the channels at the same time, so the channels containing a low voice energy level will be suppressed from the voice energy spectrum.

However, in unusually high background noise environments requiring noise suppression levels of approximately 20 dB, different noise suppression gain factors must be chosen to correspond to such levels. Furthermore, in certain applications exhibiting changing noise environments, the gain factors chosen for one background noise level may significantly degrade the voice quality when used with a different background noise level. This problem is particularly evident in automobile environments where inappropriate gain factors can cause a loss of low frequency voice components, which makes voices sound "thin" under high noise suppression.

The present embodiment solves this problem by selecting the channel gain values as a function of three variables by gain table selection means 240. The first variable is that of individual channel number 1 through N, such that a low frequency channel gain value may be selected independently from that of a high frequency channel. The second variable is the individual channel SNR estimate. These two variables perform the basis of spectral gain modification noise suppression, since the individual channels containing a low signal-to-noise ratio estimate will be suppressed from the voice energy spectrum.

The third variable is that of a multi-channel noise parameter such as the overall average background noise level of the input signal. This third variable permits automatic selection of one of a plurality of gain tables, each gain table containing a set of empirically determined channel gain values which can be selected as a function of the other two variables. This gain table selection technique allows a wider choice of channel gain values, depending on the particular background noise environment. For example, a separate gain table set with different nonlinear relationships between the low frequency and high frequency gain values may be desired in a particular background noise environment, allowing the noise suppression gain values to be adapted to changing noise environments.

Again referring to FIG. 4, the overall average background noise level is determined by applying the current valley level 435 from background noise estimator 420 to noise level quantizer 440. The current valley level represents an updated measurement of the current background noise conditions. Since the current valley level is derived from a combination of all N channel energy estimates (see the flowchart of FIG. 5), then it is a true representation of the multi-channel overall average background noise level.

The output of noise level quantizer 440 is used to select the appropriate gain table for the given noise environment. Noise level quantization is required since the current valley level is a continuously varying parameter, whereas only a discrete number of gain table sets are available from which to choose gain values. Noise level quantizer 440 utilizes hysteresis to determine a particular gain table set 450 from a range of current valley levels, as opposed to an analog (i.e., strictly linear) gain table selection mechanism.

The gain table selection signal, which is output from noise level quantizer 440, is applied to gain table switch 470 to implement the gain table selection process. Gain table switch 470 simply routes channel gain values from the appropriate gain table as determined by the noise level quantizer. Each gain table set has selected individual channel gain values corresponding to various individual channel SNR estimates 235. In the present embodiment, three gain table sets are contemplated, representing low, medium, or high background noise levels. However, any number of gain table sets may be used and any organization of channel gain values may be implemented. The raw channel gain values 455, available at the output of switch 470 are then applied to gain smoothing filter 460. Accordingly, one of a plurality of gain table sets 450 may be chosen as a function of the overall average background noise level.

As previously mentioned, when spectral gain modification noise suppression systems are used in changing background noise environments, the increased noise suppression depth often distorts the voice. Part of this distortion is inherent to spectral gain modification systems, since the continuous updating of the noise suppression gain values causes step discontinuities in the output waveform. These gain-change discontinuities are usually exhibited as a severe periodic noise flutter occuring at the low frequency frame rate.

The present invention addresses this problem by smoothing the gain values multiple times per frame of speech. A frame is defined as a period of time in which the input signal samples are quantized. At an 8 Khz sampling rate, a sample period is 125 microseconds. Thus, the frame period, being 10 milliseconds in duration, corresponds to 80 samples. When the gain values are smoothed on a per-sample basis (every sample of speech) instead of on a per-frame basis (every frame of speech), the noise flutter can be substantially reduced.

Gain smoothing filter 460 of FIG. 4 provides smoothing of raw gain values 455 on a per-sample basis for each individual channel. This per-sample smoothing of the noise suppression gain factors significantly improves noise flutter performance caused by step discontinuities in frame-to-frame gain changes. Different time constants for each channel are used to compensate for the different gain table sets employed. (The gain smoothing filter algorithm will be described later.) These smoothed gain values comprise modification signal 245 which is applied to channel gain modifier 250. As previously described, the channel gain modifier performs spectral gain modification noise suppression by reducing the gain parameter of the noisy channels. When the gain smoothing technique of the present invention is implemented, the channel gain change discontinuities no longer present an audible voice flutter problem.

Figure 5A:
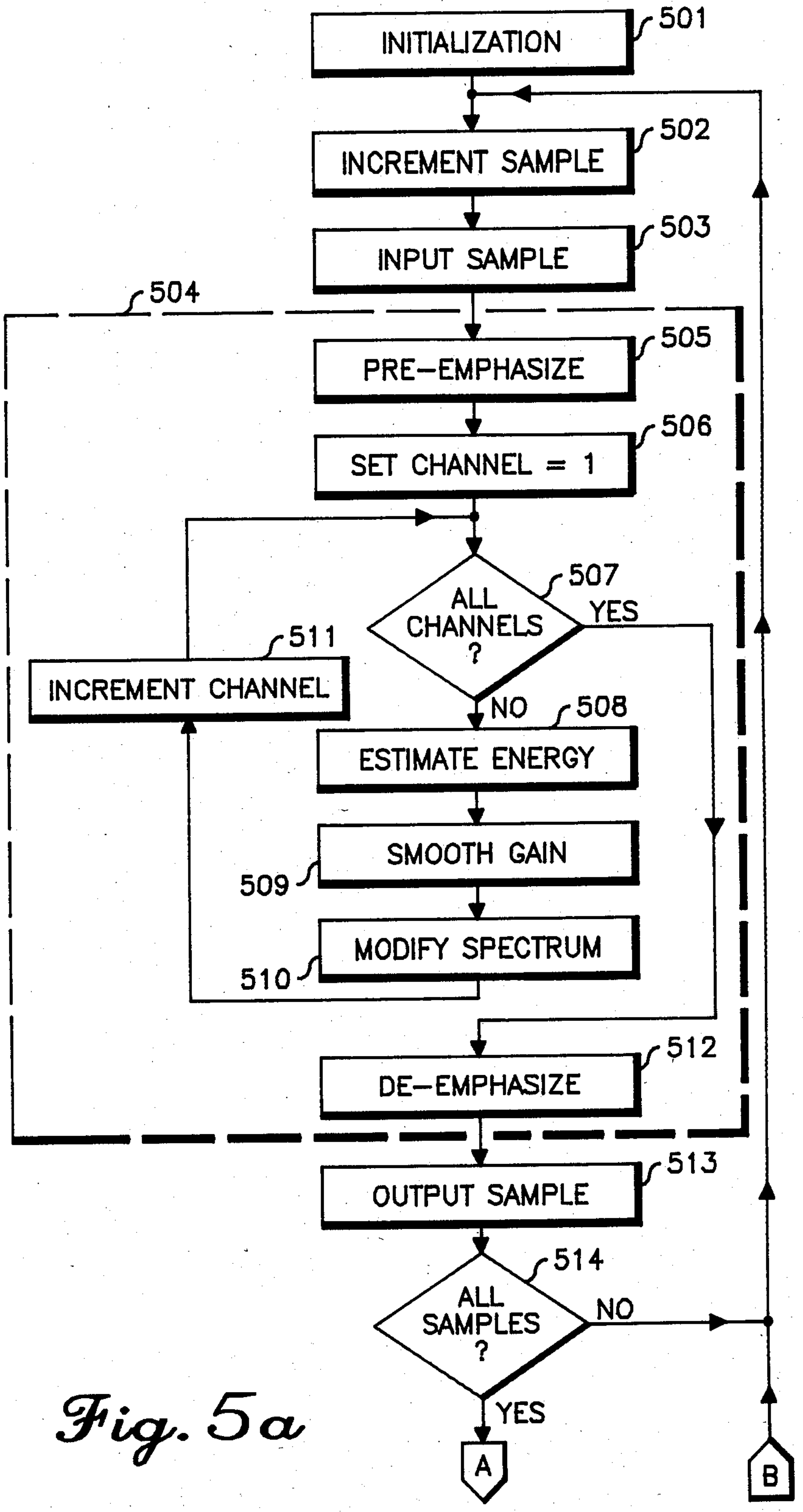
FIGS. 5*a* and *b* flowcharts illustrating the general sequence of operations performed in accordance with the practice of the present invention.

FIG. 5 is a flowchart illustrating the overall operation of the improved noise suppression system of the present invention. The generalized flow diagram of FIGS. **5*a* and 5*b* is subdivided into three functional blocks: noise suppression loop 504—further described in detail in FIG. 6*a*; automatic gain selector 515—described in more detail in FIG. 6*b*; and automatic background noise estimator 521**.

The operation of the complete noise suppression system begins with FIG. **5*a* at initialization block 501. When the system is first powered-up, no old background noise estimate exists in the energy estimate storage register, and no noise energy history exists in the energy valley detector. Consequently, during initialization 501**, the storage register is preset with an initialization value representing a background noise estimate value corresponding to a clean speech signal at the input. Similarly, the energy valley detector is preset with an initialization value representing a valley level corresponding to a noisy speech signal at the input.

Initialization block 501 also provides initial sample counts, channel counts, and frame counts. For the purposes of the following discussion, a sample period is defined as 125 microseconds corresponding to an 8 KHz sampling rate. The frame period is defined as being a 10 millisecond duration time interval to which the input signal samples are quantized. Thus, a frame corresponds to 80 samples at an 8 KHz sampling rate.

Initially, the sample count is set to zero. Block 502 increments the sample count by one, and a noisy speech sample is input (typically from an A/D converter) in block 503. The speech sample may then be pre-emphasized in block 505 to emphasize the high frequency noise and voice components to improve system performance.

Following pre-emphasis, block 506 initializes the channel count to one. Decision block 507 then tests the channel count number. If the channel count is less than the highest channel number N, the sample for that channel is bandpass filtered, and the signal energy for that channel is estimated in block 508. The result is saved for later use. Block 509 smoothes the raw channel gain for the present channel, and block 510 modifies the level of the bandpass-filtered sample utilizing the smoothed channel gain. The N channels are then combined (also in block 510) to form a single processed output speech sample. Block 511 increments the channel count by one and the procedure in blocks 507 through 511 is repeated.

If the result of the decision in 507 is true, the combined sample may be de-emphasized in block 512, and then output as a modified speech sample in block 513. The sample count is then tested in block 514 to see if all samples in the current frame have been processed. If samples remain, the loop consisting of blocks 502 through 513 is re-entered for another sample. If all samples in the current frame have been processed, block 514 initiates the procedure of block 515 for updating the individual channel gains.

Figure 5B:
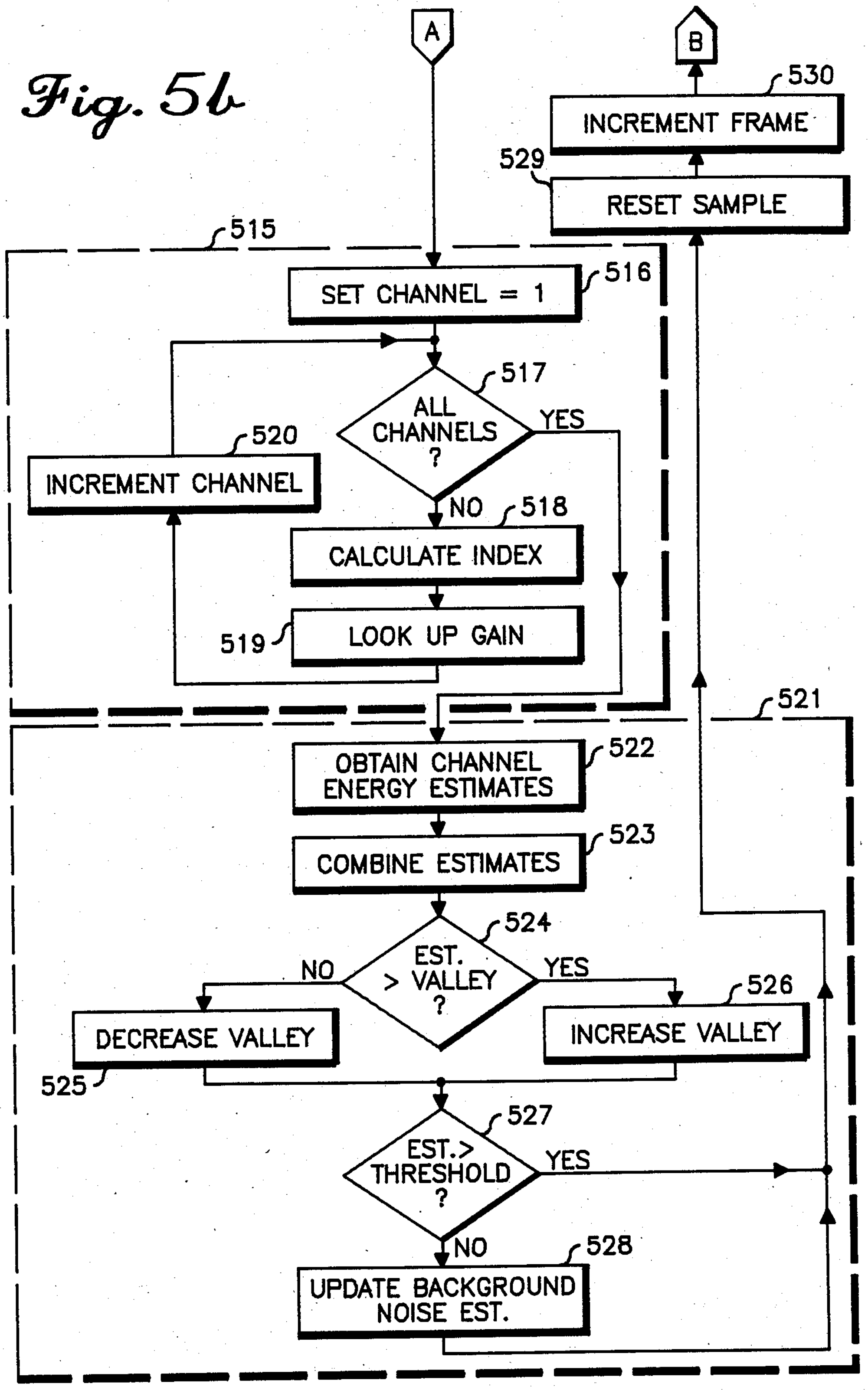

Continuing with FIG. 5*b*, block 516 initiates the channel counter to one. Block 517 tests if all channels have been processed. If this decision is negative, block 518 calculates the index to the gain table for the particular channel by forming an SNR estimate. This index is then utilized in block 519 to obtain a channel gain value from the selected look-up table. The gain value is then stored for use in noise suppression loop 504. Block 520 then increments the channel counter, and block 517 rechecks to see if all channel gains have been updated. If this decision is affirmative, the background noise estimate is then updated in block 521.

To update the background noise estimate, the present invention first obtains channel energy estimates 255 from channel energy estimator 220 in block 522. Next, the energy estimates are combined in block 523 to form an overall channel energy estimate for use by the valley detector. Block 524 compares the logarithmic value of this overall energy estimate to the previous valley level. If the log value exceeds the previous valley level, the previous valley level is updated in block 526 by increasing the level with a slow time constant. This occurs when voice, or a higher background noise level is present. If the output of decision block 524 is negative (log [energy estimate] less than previous valley level), the previous valley level is updated in block 525 by decreasing the level with a fast time constant. This previous valley level decrease occurs when minimal signal level (noise or speech) is present. Accordingly, the background noise history is continually updated by slowly increasing or rapidly decreasing the previous valley level towards the current logarithmic value of the overall energy estimate.

Subsequent to the updating of the previous valley level (block 525 or 526), decision block 527 tests if the current log [energy estimate] value exceeds a predetermined noise threshold. This noise threshold is obtained by adding a predetermined offset to the current valley level. If the result of the test is negative, a decision that only noise is present is made, and the background noise spectral estimate is updated in block 528. As previously noted, the updating process consists of storing new channel energy estimates in the background noise storage register. If the result of the test at 527 is affirmative, indicating that speech is present, the background noise estimate is not updated. In either case, the operation of background noise estimator block 521 ends when the sample count is reset in block 529 and the frame count is incremented in block 530. Operation then proceeds to block 502 to begin noise suppression on the next frame of speech.

Figure 6A:
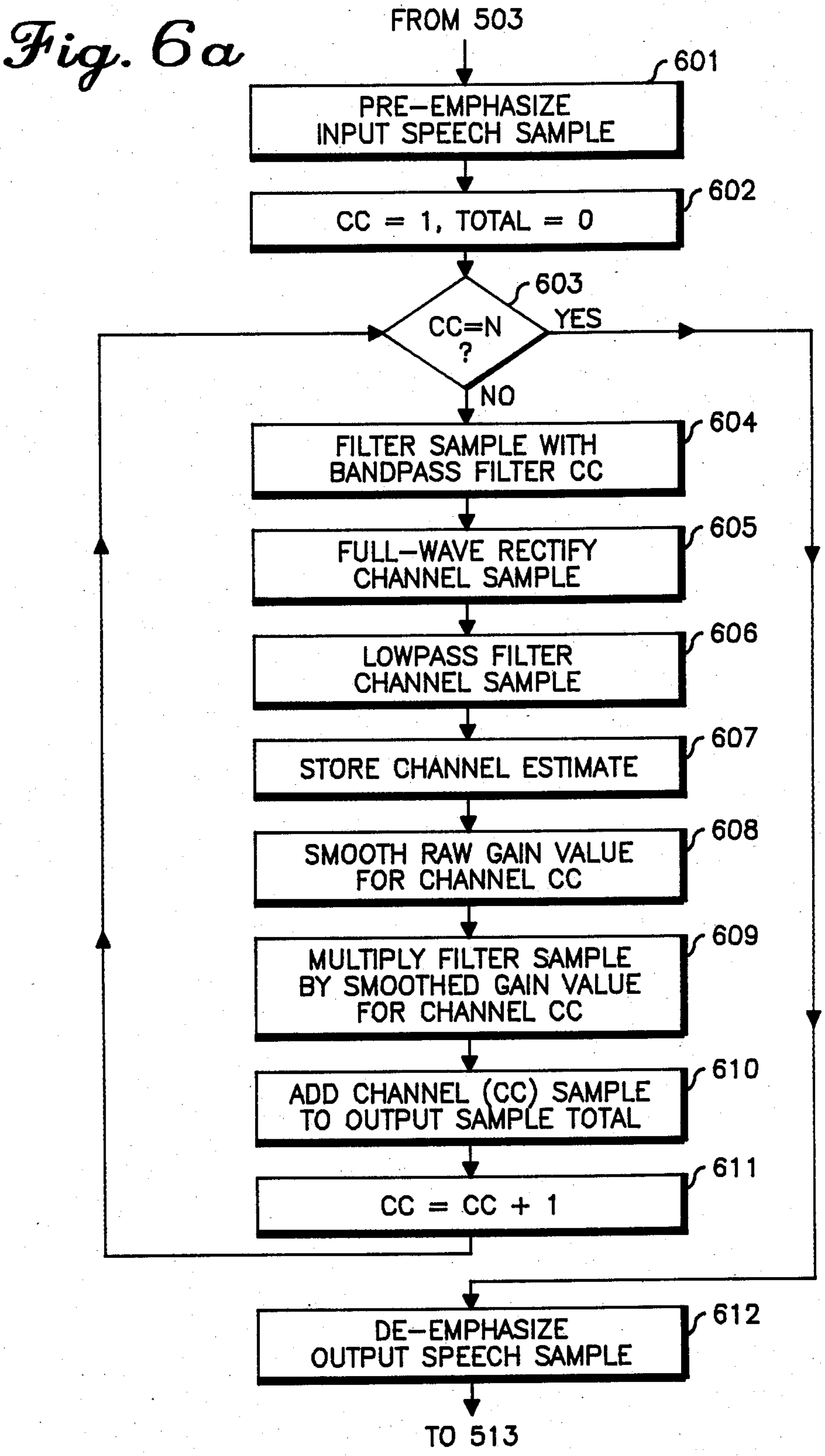
FIGS. 6*a* and *b* detailed flowcharts illustrating specific sequences of operations as shown in FIG. 5.
Figure 6B:
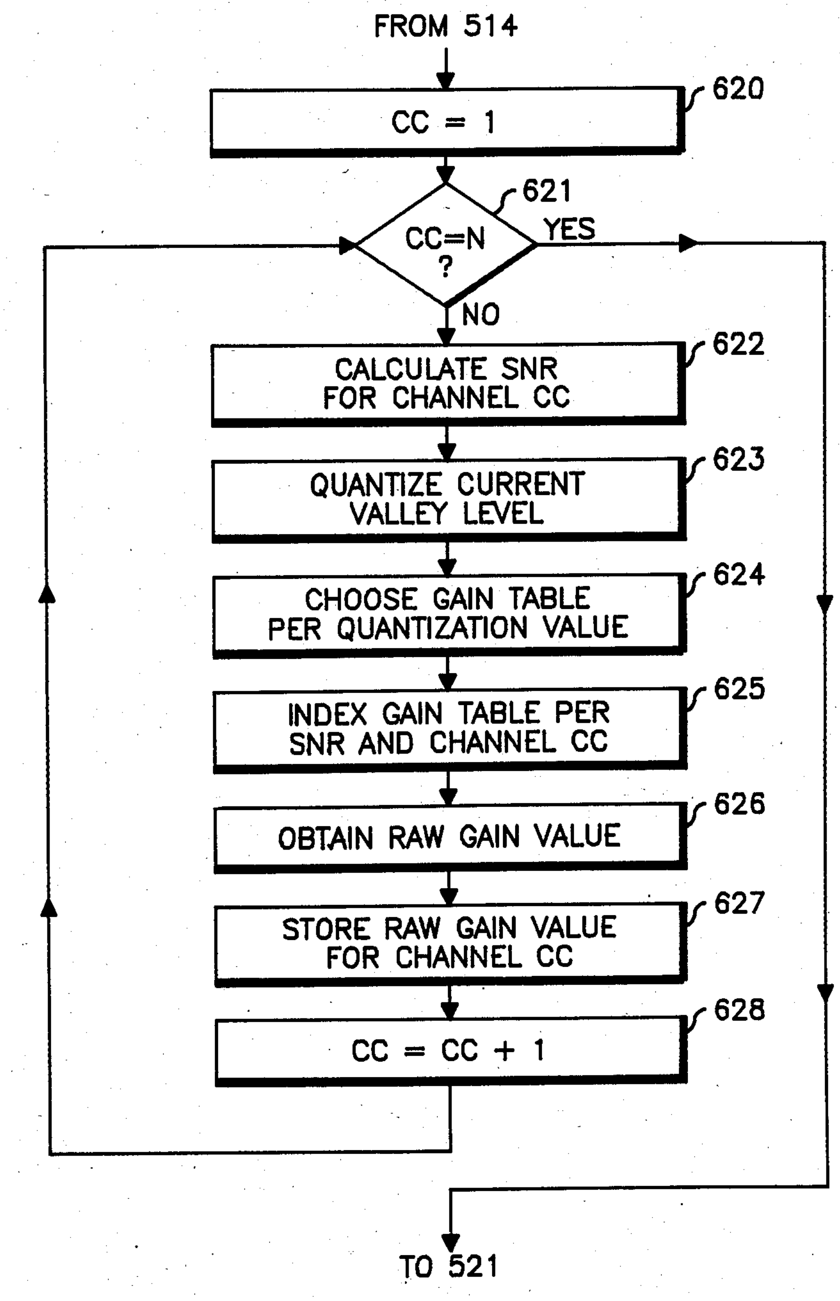

The flowchart of FIG. 6*a* illustrates the specific details of the sequence of operation of noise suppression loop 504. For every sample of incoming speech, block 601 pre-emphasizes the sample by implementing the filter described by the equation:

$$Y(nT)=X(nT)-K_1[X((n-1)T)]$$

where Y(nT) is the output of the filter at time nT, T is the sample period, X(nT) and X((n−1)T) are the input samples at times nT and (n−1)T respectively, and the pre-emphasis L coefficient $K_1$ is 0.9375. As previously noted, this filter pre-emphasizes the speech sample at approximately +6 dB per octave.

Block 602 sets the channel count (cc) equal to one, and initializes the output sample total to zero. Block 603 tests to see if the channel count is equal to the total number of channels N. If this decision is negative, the noise suppression loop begins by filtering the speech sample through the bandpass filter corresponding to the present channel count. As noted earlier, the filters are digitally implemented using DSP techniques such that they function as 4-pole Butterworth bandpass filters.

The speech sample output from bandpass filter(cc) is then full-wave rectified in block 605, and low-pass filtered in block 606, to obtain the energy envelope value E(cc) for this particular sample. This channel energy estimate is then stored by block 607 for later use. As will be apparent to those skilled in the art, energy envelope value E(cc) is actually an estimate of the square root of the energy in the channel.

Block 608 obtains the raw gain value RG for channel cc and performs gain smoothing by means of a first order IIR filter, implementing the equation:

$$G(nT)=G((n-1)T)+K_2(cc)(RG(nT)-G(n-1)T)$$

where G(nT) is the smoothed channel gain at time nT, T is the sample period, G((n−1)T) is the smoothed channel gain at time (n−1)T, RG(nT) is the computed raw channel gain for the last frame period, and $K_2(cc)$ is the filter coefficient for channel cc. This smoothing of the raw gain values on a per-sample basis reduces the discontinuities in gain changes, thereby significantly improving noise flutter performance.

Block 609 multiplies the filtered sample obtained in block 604 by the smoothed gain value for channel cc obtained from block 608. This operation modifies the level of the bandpass filtered sample using the current channel gain, corresponding to the operation of channel gain modifier 250. Block 610 then adds the modified filter sample for channel cc to the output sample total, which, when performed N times, combines the N modified bandpass filter outputs to form a single processed speech sample output. The operation of block 610 corresponds to channel combiner 260. Block 611 increments the channel count by one and the procedure in blocks 603 through 611 is then repeated.

If the result of the test in 603 is true, the output speech sample is de-emphasized at approximately −6 dB per octave in block 612 according to the equation:

$$Y(nT)=X(nT)+K_3[Y((n-1)T)]$$

where X(nT) is the processed speech sample at time nT, T is the sample period, Y(nT) and Y((n−1)T) are the de-emphasized speech samples at times nT and (n−1)T respectively, and $K_3$ is the de-emphasis coefficient which has a value of 0.9375. The de-emphasized processed speech sample is then output to the D/A converter block 513. Thus, the noise suppression loop of FIG. *6a* illustrates both the channel filter-bank noise suppression technique and the per-sample channel gain smoothing technique.

The flowchart of FIG. *6b* more rigorously describes the detailed operation of automatic gain selector block 515 of FIG. *5b*. Following processing of all speech samples in a particular frame, the individual channel gains are then updated. First of all, the channel count (cc) is set to one in block 620. Next, decision block 621 tests if all channels have been processed. If not, operation proceeds with block 622 which calculates the signal-to-noise ratio for the particular channel. As previously mentioned, the SNR calculation is simply a division of the per-channel energy estimates (signal-plus-noise) by the per-channel background noise estimates (noise). Therefore, block 622 simply divides the current stored channel energy estimate from block 607 by the current background noise estimate from block 528 according to the equation:

Index (cc)=current frame energy for channel cc]/[background noise energy estimate for channel cc].

The current valley level, 435 of FIG. 4, is then quantized in block 623 to produce a digital gain table selection signal from an analog valley level. Hysteresis is used in quantizing the valley level, since the gain table selection signal should not be responsive to minimal changes in current valley level.

In block 624, the particular gain table to be indexed is chosen. In the present embodiment, the quantized value of the current valley level generated in block 623 is used to perform this selection. However, any method of gain table selection may be used.

The SNR index calculated in block 622 is used in block 625 to look up the raw channel gain value from the appropriate gain table. Hence, the gain value is indexed as a function of three variables: (1) the channel number; (2) the current channel SNR estimate; and (3) the overall average background noise level. The raw gain value is then obtained in block 626 according to this three-variable index.

Block 627 stores the raw gain value obtained in block 626. Block 628 then increments the channel count, and decision block 621 is re-entered. After all N channel gains have been updated, operation proceeds to block 521 to update the current valley level and the current background noise estimate. Hence, automatic gain selector block 515 updates the channel gain values on a frame-by-frame basis as a function of a multi-channel noise parameter, such as the overall average background noise level, to more accurately generate noise suppression gain factors for each particular channel.

In summary, the present invention improves the performance of spectral gain modification noise suppression systems by utilizing overall average background noise to generate the noise suppression gain factors, and by smoothing these gain factors on a per-sample basis. These novel techniques allow the present invention to improve acoustic noise suppression performance in high ambient noise backgrounds without degrading the quality of the desired speech signal.

While specific embodiments of the present invention have been shown and described herein, further modifications and improvements may be made by those skilled in the art. All such modifications which retain the basic underlying principles disclosed and claimed herein are within the scope of this invention.

What is claimed is:

1. An improved noise suppression system for attenuating the background noise from a noisy input signal to produce a noise-suppressed output signal, said noise suppression system comprising:
   - means for separating the input signal into a plurality of pre-processed signals representative of selected frequency channels;
   - means for modifying an operating parameter of each of said plurality of pre-processed signals provided by said signal separating means to provide a plurality of post-processed signals; and
   - means responsive to said plurality of pre-processed signals for generating a modification signal having a selected modification value for each channel for application to said modifying means to enable the operating parameter to be modified, said modification signal generated by automatically selecting a modification value for each channel from one of a plurality of sets of modification values for that channel.

2. An improved noise suppression system for attenuating the background noise from a noisy input signal to produce a noise-suppressed output signal, said noise suppression system comprising:
   - means for separating the input signal into a plurality of pre-processed signals representative of selected frequency channels, each of said plurality of pre-processed signals comprised of a plurality of frames, each frame comprised of a plurality of samples of said input signal;
   - means for modifying an operating parameter of each of said plurality of pre-processed signals provided by said signal separating means to provide a plurality of post-processed signals; and
   - means responsive to said plurality of pre-processed signals for generating a modification signal for application to said modifying means to enable the operating parameter to be modified, said modification signal generating means including means for smoothing said modification signal multiple times per frame.

3. The improved noise suppression system according to claim 2, wherein said smoothing means operates on a per-sample basis.

4. The improved noise suppression system according to claim 1 or 2, wherein said separating means includes a plurality of bandpass filters.

5. The improved noise suppression system according to claim 1 or 2, wherein said operating parameter of each of said plurality of pre-processed signals is the gain of said signal.

6. The improved noise suppression system according to claim 1 or 2, wherein said modification signal for application to said modifying means is comprised of a plurality of predetermined gain values.

7. The improved noise suppression system according to claim 1 or 2, further comprising:

means for combining said plurality of post-processed signals to produce said noise-suppressed output signal.

8. An improved noise suppression system for attenuating the background noise from a noisy input signal to produce a noise-suppressed output signal, said noise suppression system comprising:

means for separating the input signal into a plurality of pre-processed signals representative of selected frequency channels;

means for generating an estimate of the signal-to-noise ratio (SNR) in each individual channel;

means for producing a gain value for each channel by automatically selecting one of a plurality of gain tables in response to a multi-channel noise parameter, and selecting one of a plurality of gain values from the selected gain table in response to said channel SNR estimates and the channel number; and means for modifying the gain of each of said plurality of pre-processed signals provided by said signal separating means in response to said gain values to provide a plurality of post-processed signals.

9. An improved noise suppression system for attenuating the background noise from a noisy input signal to produce a noise-suppressed output signal, said noise suppression system comprising:

means for separating the input signal into a plurality of pre-processed signals representative of selected frequency channels, each of said plurality of pre-processed signals comprised of a plurality of frames, each frame comprised of a plurality of samples of said input signal;

means for generating an estimate of the signal-to-noise ratio (SNR) in each individual channel once each frame;

means for producing a raw gain value for each channel in response to said SNR estimates once each frame;

means for smoothing said raw gain values multiple times per frame; and means for modifying the gain of each of said plurality of pre-processed signals provided by said signal separating means in response to said smoothed gain values to provide a plurality of post-processed signals.

10. The improved noise suppression system according to claim 8 or 9, further comprising:

means for combining said plurality of post-processed signals to produce said noise-suppressed output signal.

11. The improved noise suppression system according to claim 8 or 9, wherein said separating means includes a plurality of bandpass filters covering the voice frequency range.

12. The improved noise suppression system according to claim 8 or 9, wherein said SNR generating means includes means for dividing current input signal energy estimates by previous background noise energy estimates for each individual channel.

13. The improved noise suppression system according to claim 8 or 9, wherein said gain modifying means includes means for multiplying the amplitude of each of said plurality of pre-processed signals by the appropriate predetermined channel gain value, thereby providing said plurality of post-processed signals.

14. The improved noise suppression system according to claim 10, wherein said combining means includes means for summing said plurality of post-processed signals to form a single output signal.

15. The improved noise suppression system according to claim 8, wherein said multi-channel noise parameter is the overall average background noise level of all channels comprising said input signal.

16. The improved noise suppression system according to claim 9, wherein said gain smoothing means operates on a per-sample basis.

17. An improved noise suppression system for attenuating the background noise from a noisy pre-processed input signal to produce a noise-suppressed post-processed output signal by spectral gain modification, said noise suppression system comprising:

signal dividing means for separating the pre-processed input signal into a plurality of selected frequency bands, thereby producing a plurality of pre-processed channels;

channel energy estimation means for generating an estimate of the energy in each of said plurality of pre-processed channels;

channel noise estimation means for generating an estimate of the signal-to-noise ratio (SNR) of each individual channel based upon said channel energy estimates and an estimate of the current background noise energy for that individual channel;

channel gain controlling means for providing channel gain values, said channel gain controlling means having a plurality of gain tables, each gain table having predetermined individual channel gain values corresponding to various individual channel SNR estimates, said channel gain controlling means further having gain table selection means for automatically selecting one of said plurality of gain tables according to the overall average background noise level of said input signal;

channel gain modifying means for adjusting the gain of each of said plurality of pre-processed channels provided by said signal dividing means according to said channel gain values, thereby producing a plurality of post-processed channels; and channel combination means for recombining said plurality of post-processed channels to produce said post-processed output signal.

18. The improved noise suppression system according to claim 17, wherein each individual channel gain value provided by said channel gain controlling means is selected as a function of (a) the channel number, (b) the current channel SNR estimate, and (c) the overall average background noise level.

19. The improved noise suppression system according to claim 17, further comprising:

gain smoothing means for smoothing the gain values provided by said channel gain controlling means to said channel gain modifying means.

20. The improved noise suppression system according to claim 17, wherein said gain table selection means includes noise level quantization means for providing a digital gain table selection signal in response to the analog level of the average background noise of said input signal.

21. The improved noise suppression system according to claim 20, wherein said noise level quantization means includes hysteresis such that said gain table selection signal is not responsive to minimal changes in the average background noise level of said input signal.

22. The improved noise suppression system according to claim 17, wherein said channel noise estimation means further includes;

background noise estimation means for generating and storing an estimate of the background noise power spectral density of said pre-processed input signal; and channel SNR estimation means for generating an estimate of the SNR of each individual channel based upon the current background noise energy estimate and the current input signal energy estimate.

23. The improved noise suppression system according to claim 22, wherein said background noise estimation means includes valley detector means for periodically detecting the minima of the input signal energy such that said background noise estimates are updated only during said minima.

24. The improved noise suppression system according to claim 19, wherein said gain smoothing means operates on a per-sample basis.

25. An improved channel gain controller for use with a spectral gain modification noise suppression system having separating means to divide a noisy input signal into a plurality of channels, and a modifying means to adjust the gain of said channels according to gain values provided by the channel gain controller to produce a plurality of noise-suppressed output channels, said channel gain controller comprising:

a plurality of gain tables, each having predetermined individual channel gain values corresponding to various individual channel signal-to-noise ratio (SNR) estimates; and gain table selection means for automatically selecting one of said plurality of gain tables according to the overall average background noise level of said noisy input signal.

26. The improved channel gain controller according to claim 25, wherein each individual channel gain value provided by said channel gain controller is selected as a function of (a) the channel number, (b) the current channel SNR estimate, and (c) the overall average background noise level.

27. The improved channel gain controller according to claim 25, wherein said gain table selection means further includes noise level quantization means for providing a digital gain table selection signal in response to the analog level of the average background noise of said input signal.

28. The improved channel gain controller according to claim 27, wherein said noise level quantization means includes hysteresis such that said gain table selection signal is not responsive to minimal changes in the average background noise level of said input signal.

29. The improved channel gain controller according to claim 25, further comprising:

gain smoothing means for smoothing the gain values provided by said channel gain controller to said noise suppression system modifying means.

30. The improved channel gain controller according to claim 29, wherein said gain smoothing means operates on a per-sample basis.

31. The method of attenuating the background noise from a noisy input signal to produce a noise-suppressed output signal comprising the steps of:

separating the input signal into a plurality of pre-processed signals representative of selected frequency channels;

modifying an operating parameter of each of said plurality of pre-processed signals to provide a plurality of post-processed signals; and generating a modification signal responsive to said plurality of pre-processed signals, said modification signal having a selected modification value for each channel to enable the operating parameter to be modified, said modification signal generated by automatically selecting a modification value for each channel from one of a plurality of sets of modification values for that channel.

32. The method of attenuating the background noise from a noisy input signal to produce a noise-suppressed output signal in a noise suppression system comprising the steps of:

separating the input signal into a plurality of pre-processed signals representative of selected frequency channels, each of said plurality of pre-processed signals comprised of a plurality of frames, each frame comprised of a plurality of samples of said input signal;

modifying an operating parameter of each of said plurality of pre-processed signals to provide a plurality of post-processed signals; and generating a modification signal responsive to said plurality of pre-processed signals, said modification signal having a selected modification value for each channel to enable the operating parameter to be modified, said modification values being smoothed multiple times per frame to reduce discontinuities in said modification signal.

33. The method according to claim 32, wherein said modification values are smoothed on a per-sample basis.

34. The method according to claim 31 or 32, wherein said operating parameter of each of said plurality of pre-processed signals is the gain of said signal.

35. The method according to claim 31 or 32, further comprising the step of:

combining said plurality of post-processed signals to produce said noise-suppressed output signal.

36. The method of attenuating the background noise from a noisy input signal to produce a noise-suppressed output signal by spectral gain modification, comprising the steps of:

separating the input signal into a plurality of pre-processed signals representative of selected frequency channels;

generating an estimate of the signal-to-noise ratio (SNR) in each individual channel;

producing a gain value for each channel by automatically selecting one of a plurality of gain tables in response to a multi-channel noise parameter, and selecting one of a plurality of gain values from the selected gain table in response to said channel SNR estimates and the channel number; and modifying the gain of each of said plurality of pre-processed signals in response to said gain values to provide a plurality of post-processed signals.

37. The method of attenuating the background noise from a noisy input signal to produce a noise-suppressed output signal by spectral gain modification, comprising the steps of:

separating the input signal into a plurality of pre-processed signals representative of selected frequency channels, each of said plurality of pre-processed signals comprised of a plurality of frames, each frame comprised of a plurality of samples of said input signal;

generating an estimate of the signal-to-noise ratio (SNR) in each individual channel once each frame;

producing a raw gain value for each channel in response to said SNR estimates once each frame;

smoothing said raw gain values multiple times per frame; and modifying the gain of each of said plurality of pre-processed signals in response to said smoothed gain values to provide a plurality of post-processed signals.

38. The improved noise suppression system according to claim 36, wherein said multi-channel noise parameter is the overall average background noise level of all channels comprising said input signal.

39. The method according to claim 37, wherein said gain values are smoothed on a per-sample basis.

40. The improved noise suppression system according to claim 36 or 37, wherein said SNR estimates are generated by dividing current input signal energy estimates by previous background noise energy estimates for each individual channel.

41. The improved noise suppression system according to claim 36 or 37, wherein the channel gains are modified by multiplying the amplitude of each of said plurality of pre-processed signals by the appropriate channel gain value, thereby providing said plurality of post-processed signals.

42. The method according to claim 36 or 37, further comprising the step of:

combining said plurality of post-processed signals to produce said noise-suppressed output signal.

* * * * *